United States Patent [19]
Allen

[11] 4,091,365
[45] May 23, 1978

[54] SEWER DRAIN ALARM UNIT

[76] Inventor: Edward L. Allen, 92 Hillside Ave., Hillside, N.J. 07205

[21] Appl. No.: 749,216

[22] Filed: Dec. 10, 1976

[51] Int. Cl.² .............................................. G08B 21/00
[52] U.S. Cl. .............................. 340/243; 200/81.9 M; 200/84 C; 340/244 D
[58] Field of Search .............. 340/243, 244, 245, 246; 200/81.9 M, 84 R, 84 C; 73/307, 308

[56] References Cited

U.S. PATENT DOCUMENTS

| 161,680 | 4/1875 | Guest | 200/84 R |
|---|---|---|---|
| 357,056 | 2/1887 | Weil | 340/245 |
| 2,307,304 | 1/1943 | Rudd | 200/81.9 M |
| 2,985,187 | 5/1961 | Hamilton | 340/244 A |
| 3,757,316 | 9/1973 | Fiorenzo | 340/243 |

FOREIGN PATENT DOCUMENTS 72,568   6/1916   Switzerland ..................... 340/245

Primary Examiner—John W. Caldwell, Sr.
Assistant Examiner—Daniel Myer
Attorney, Agent, or Firm—Henry C. Dearborn

[57] ABSTRACT

A sewer back-up alarm unit. It replaces the plug in an access opening. And, it has a solid wall with a short pivoted arm mounted on the inside of the wall. The arm is angled and pivots freely between two positions, as limited by the wall. There is a liquid level float that is hung from one end of the arm by a flexible chain. A counterweight is mounted on the other end of the arm to pivot it to the position opposite to the one which the weight of the float causes. There is a magnetic switch mounted on the outside of the solid wall, and a magnet on the arm actuates the switch when the float is raised by the level of liquid in the sewer. An alarm circuit may be connected to the switch, as desired.

10 Claims, 3 Drawing Figures

SEWER DRAIN ALARM UNIT

BACKGROUND OF THE INVENTION

1. Field of the Invention

This invention concerns an alarm device for liquid level changes in general. More specifically, it deals with an apparatus that is particularly adaptable for use in residential dwelling sewer systems.

2. Description of the Prior Art

Heretofore, there have been various proposals for providing means to signal an alarm when the fluid level in a sewer system backs up. However, all such known devices have had various drawbacks. For example, there is a U.S. Pat. No. 3,757,316, which has a sensing device in the form of a pair of electrodes that are immersed in the fluid when the level rises to a certain height. The change in conductivity is measured and therefore this depends upon a relatively sensitive change. Furthermore, these electrodes would be subject to corrosion, and in addition they subject the sewage fluids to whatever electrical signals exist on the electrodes.

Another prior device is shown by U.S. Pat. No. 3,774,187. It discloses a float supported by a vertical rod that makes sliding movement through its guides in order to close an electrical contact at the top of the rod when the fluid rises. This arrangement is clearly subject to sticking with corrosion from nonuse, and it employs a point contact switch which would be very unreliable.

Consequently, it is an object of this invention to provide a simple, yet highly reliable system that will indicate the potential backup of sewage in a residential sewage drain.

SUMMARY OF THE INVENTION

Briefly, the invention concerns an alarm unit for use in a sewer drain of a dwelling or the like. It comprises a solid walled plug having integral male pipe threads thereon, adapted for fitting the female threads on an access opening to a low level pipe in said drain, and a pivotal arm attached beneath said solid wall on the side toward said access opening. It also comprises a float for sensing a rise in fluid level at said access opening, and means for hanging said float from said arm at a predetermined level relative to said drain pipe, with the arm in one pivotal position. It also comprises means for biasing said arm toward another pivotal position in the absence of the weight of said float, and means for actuating an alarm when said arm goes to said other pivotal position.

Again briefly, the invention concerns an alarm unit for use in a sewer drain of a dwelling or the like. It comprises a solid walled plug having integral male pipe threads thereon adapted for fitting the female threads on an access opening to a low level pipe in said drain. The said solid wall is nonmagnetic to permit passage of a magnetic field therethrough. It also comprises a pair of lugs integral with said solid wall and protruding therefrom on the side toward said access opening when the plug is mounted therein, and a corrosion proof pivot extending between said lugs. It also comprises an angled arm mounted on said pivot pin for free pivotal movement between two extreme positions, one for each end of said arm being in contact with said solid wall. It also comprises a spherical float for sensing a rise in fluid level in said sewer drain adjacent to said low level drain pipe, and a corrosion proof chain for hanging said float from one end of said angled arm. It also comprises a permanent magnet attached to said one end of said angled arm on the side toward said solid wall, and a counterweight attached to the other end of said angled arm for biasing said arm into the extreme position with said permanent magnet in contact with said solid wall. The said spherical float being heavy enough to hold said angled arm in the other extreme position when hanging free. It also comprises a recess in the outside surface of said solid wall adjacent to the location where said permanent magnet contacts the other side thereof, and a magnetic type reed-switch mounted in said recess for being actuated when said permanent magnet contacts said solid wall, and an electrical circuit connection for connecting said switch into an alarm circuit.

Again briefly, the invention concerns a sewer drain back-up warning unit. It comprises in combination a pipe threaded cap for replacing the plug of an access opening into said sewer drain. The said cap has a solid wall for maintaining said access opening plugged. It also comprises an angled arm pivotally mounted on the inside of said solid wall for free pivotal movement between two positions limited by said wall, and a float hung from one end of said arm by a flexible chain having a predetermined length. It also comprises a magnet carried by said float end of said arm. The said solid wall is nonmagnetic at least in the vicinity of said magnet. It also comprises a counter-weight on the other end of said arm for biasing the arm into said position with the magnet adjacent to said wall when the weight of said float is removed, and magnetic switch means adapted for actuation by said magnet when said arm is in said biased position.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

It has been found that in sewer systems as employed with dwelling units, there is a tendency for blockage to develop in the line leading out from the dwelling to the main sewer line under the street. Such blockage will cause backup of the sewage fluids which is, of course, highly undesirable. Particularly in older dwelling systems, the exit drain line between the house and street may become clogged due to root growth and similar foreign matter intrusion so that periodic clearing out of the line becomes necessary. In such case it becomes extremely beneficial to have advance warning of a potential clogging which will cause backup and flooding of the dwelling when the toilets are flushed. Furthermore, it should be noted that, particularly with root growth blockage, a clearing of the line will quite likely not remain permanent. Consequently, it becomes of great benefit to have an advance warning indication such as that which is provided by a unit according to this invention. Also, because of the length of time between occurrences of backup conditions it is important to have an alarm unit that is simple in construction yet very reliable so that the desired warning will not fail to work.

Figure 1:
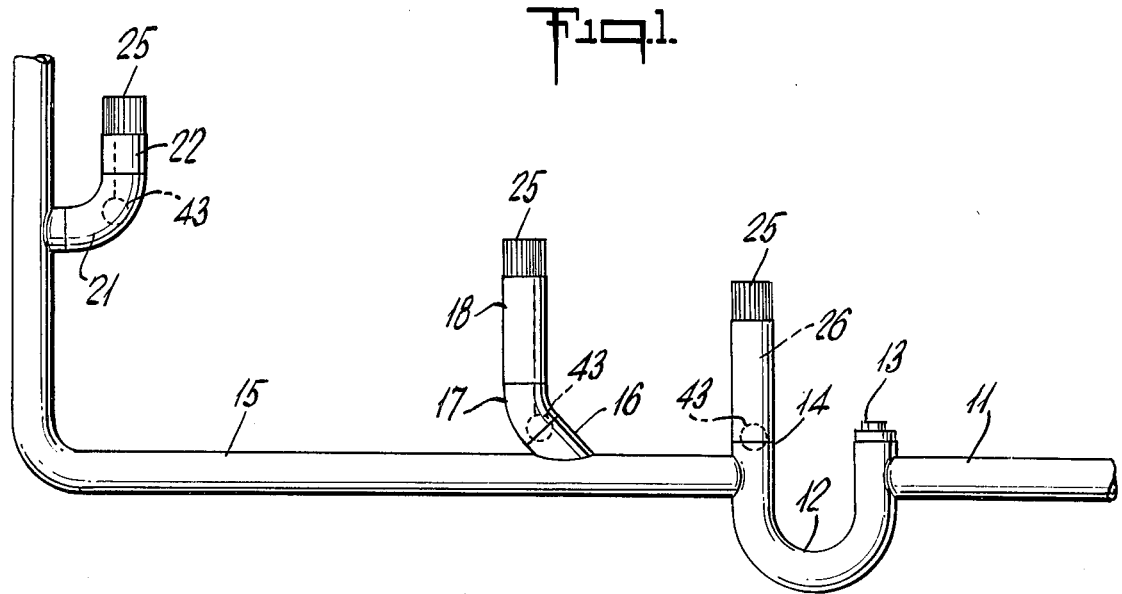
FIG. 1 illustrates three alternative arrangements for mounting an alarm according to the invention in a residential type sewer system.

Referring to FIG. 1, there is shown a sewer line or pipe 11. This represents the connection from a dwelling unit to the street sewer system mentioned above. This connection is usually underground and/or buried under the cellar floor (not shown) of the dwelling. It may include a trap 12, with a clean-out plug 13 on one side. The other side may have an access opening 14 on the upstream side of the trap.

It will be appreciated that the FIG. 1 showing is schematic, particularly in regard to its showing of three alternative ways for mounting an alarm unit according to the invention. Of course, only one of these arrangements would be employed for a given dwelling (not shown), depending on the type of access used in that dwelling's sewer system.

Thus, an inside drain pipe 15, that is usually located beneath the cellar floor (not shown), may have an access opening at the end of a 45° joint or elbow 16. This, of course, connects into the drain line 15, with its open end above the floor but at an angle of 45°. In this case, an alarm unit according to this invention will need to have another elbow 17 connected to the access opening and it may have a vertical riser 18 joined therewith.

Another type of access opening is one that employs a 90° elbow 21 that is shown joining the drain line 15 on a vertical portion thereof. Conventionally, there would be a removable plug (not shown) in the open end of the elbow 21. However, in order to accommodate an alarm unit according to the invention there will be a vertical section of pipe 22 added onto the open end of the elbow 21.

As indicated above, the FIG. 1 illustration shows three alternatives to illustrate different types of openings in a sewer drain system. In each case, there is a unit 25 which is schematically indicated as being connected to the top of the vertical risers 18 and 22, as well as a vertical section of pipe 26.

Figure 2:
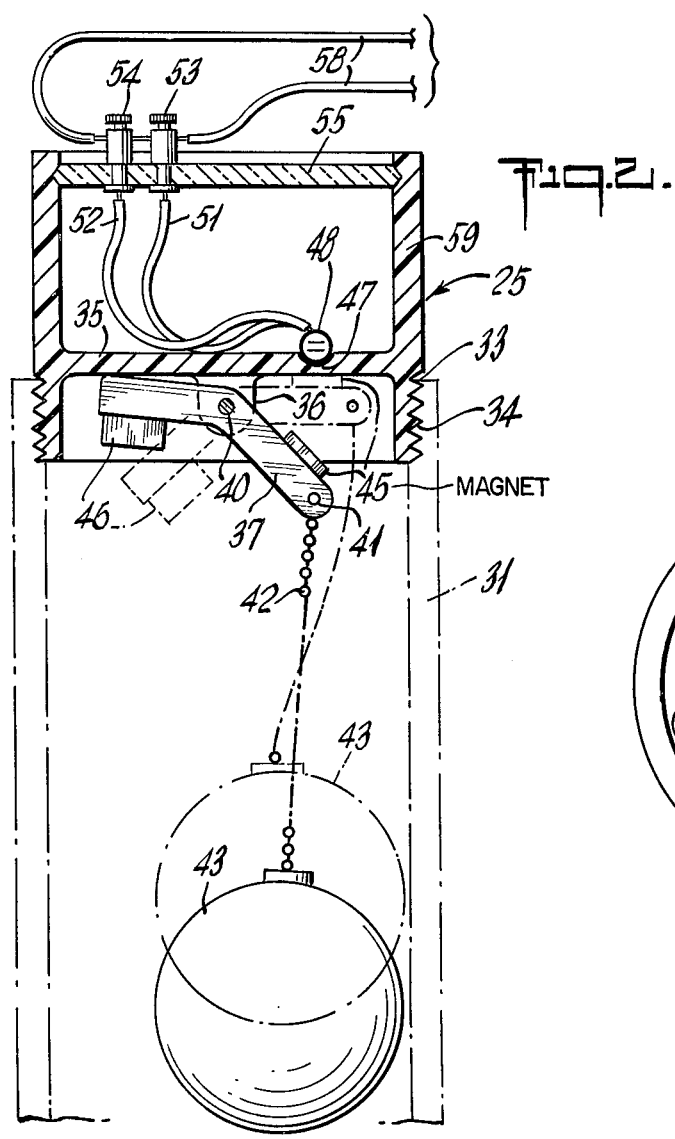
FIG. 2 is an enlarged longitudinal cross section view illustrating an alarm unit according to the invention.
Figure 3:
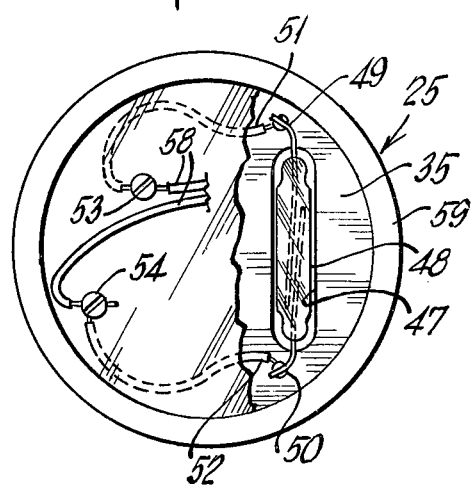
FIG. 3 is a top plan view of the unit shown in FIG. 2, partly broken away to show the magnetic type electric switch of the unit.

Referring to FIGS. 2 and 3, it will be observed that an alarm unit 25 is illustrated with an indication as to how it would be mounted. Thus, it is shown in place in the top of a riser 31, which is shown in dashed lines. Of course, this riser pipe might take any of the alternative forms indicated above in connection with FIG. 1. It will be appreciated that there only needs to be sufficient vertical clearance to accommodate a hanging float 43 so that it will be supported freely above the highest normal level of fluid in the sewer drain pipes during unclogged use.

The unit 25 is made up of a solid-walled plug-type structure. It includes integrally fabricated male pipe threads 34 on the outside of a lower skirt 33 that is moulded or cast as part of the body of the unit 25. These threads 34 will, of course, be machined to fit standard pipe threads so that the unit 25 may replace a conventional plug that is used to close an access opening.

The solid wall structure of the unit 25 is a solid transverse section 35 that has a pair of integral protuberant lugs 36, only one of which is visible. These lugs 36 support an angled arm 37 in a pivotal manner by means of a pivot pin 40. On one end of the arm 37 there is an attachment hole 41 to which is fastened a flexible chain 42. The chain 42 might, of course, take other forms so long as it provides a very flexible means for hanging a spherical float 43 from the end of the arm 37.

On the other end of the arm 37 there is a counterweight 46 which is heavy enough to bias the arm into the other position from that illustrated, i.e., that indicated in dashed lines. It will be understood that the biased position is what happens when the weight of the float 43 is removed. Otherwise, when the float 43 is hanging free, its weight on the arm 37 (which is freely pivotable) will cause the arm to take up the position illustrated in full lines.

On the same end of the arm 37 as that to which the float 43 is attached, there is a permanent magnet 45 fastened. It is on the upper side of the arm 37 so that it will make contact with the wall 35 when the weight of the float 43 is removed. On the outside of the solid wall 35, there is a recess 47 that accommodates a magnetic-type reed-switch 48. It has electrical circuit connection wires 51 and 52 that are connected to terminals 49 and 50 respectively of the switch 48. The wires 51 and 52 are for carrying an electrical circuit out from the top of the unit, and there are terminal connectors 53 and 54 respectively to which the wires 51 and 52 are connected and from which an electrical circuit may be completed via a pair of wires 58, as indicated. The terminals 53 and 54 are mounted through a plate 55 which may be made of clear plastic or the like and acts as a protective or dust cover for the interior where the switch 48 is located. However, it will be understood stood that various other and different arrangements might be made. For example, the connection terminals 53 and 54 could be mounted through the vertical sides 59 of the unit 25, if desired.

It will be understood that the switch 48 is a conventional type which may be purchased on the open market. It has reed like contacts (as indicated in the drawings) and it is actuated to close the contacts by the presence of a magnetic field. The magnet 45 is one of the conventional magnets available today which has a strong field which will close the contacts of switch 48 in a positive manner when the magnet is in contact with the underside of the wall 35. Also, it will be clear to anyone skilled in the art that the wall 35 must be nonmagnetic material to permit the field of the magnet 45 to penetrate and affect the actuation of the switch 48. A feasible material for the body of the unit 25, including the solid wall 35 is the plastic known by the common designation PVC. However, it may be preferable to employ a variation known as CPVC which has the ability to withstand higher temperatures. Of course, if local building codes prohibit those materials, nonmagnetic metals such as bronze or brass should be satisfactory. Also, it should be noted that magnetic metals such as cast iron or steel could be employed so long as there is a sufficient area of nonmagnetic material in the wall 35 adjacent to the switch 48 so that the magnetic field would be effective.

It will be appreciated by anyone skilled in the art that any feasible arrangement (not shown) may be employed with the electrical circuit to which the wires 58 are connected. An alarm device such as a bell and/or light, etc., may be connected to the house current with a transformer. Or, of course, a separate battery supply may be employed.

An important feature of the invention is that by reason of its small number of moving parts and the basic simplicity of its construction, it may be constructed of somewhat costly materials which will insure that it will be foolproof and entirely reliable. Thus, it is to be expected that the pivot pin 40 would be constructed of stainless steel as would the chain 42, particularly since these are subjected to the more corrosive atmosphere on the inside of the sewer line.

OPERATION

It will be appreciated from the foregoing that a unit according to the invention will be mounted in an access opening to be found in the sewer system as generally indicated in FIG. 1. It is mounted such that the float ball 43 hanging by its supporting chain 42 is freely supported within the riser 31 so as to avoid any possible malfunction caused by sticking of the ball.

When the sewer line 11 backs up sufficiently to cause a rise in the fluid level at the access opening, e.g., 14 or 16 or 21, it will cause the float 43 to rise and remove its weight from the angled arm 37. Consequently, the counterweight 46 will cause the arm 37 to pivot to its other position (shown in dashed lines) such that the magnet 45 will make contact with the wall section 35. This then will bring the magnetic field close enough to act upon the reed switch 48 and so actuate it to close the circuit of the alarm system.

An important advantage of a sewer back-up warning unit according to the invention is that it may be located in the lowest access opening of the particular residence, and because the ball hangs just above or at the top of the sewer line, even a partial clogging will cause a sufficient rise to set off the alarm.

While a particular embodiment of the invention has been described above in considerable detail, in accordance with the applicable statutes, this is not to be taken as in any way limiting the invention but merely as being descriptive thereof.

I claim:

1. An alarm unit for use in a sewer drain of a dwelling or the like comprising
    a solid walled plug having integral male pipe threads thereon adapted for fitting the female threads on an access opening to a low level pipe in said drain,
    a pivotal arm attached beneath said solid wall on the side toward said access opening,
    a float for sensing a rise in fluid level at said access opening,
    means for hanging said float from said arm at a predetermined level relative to said drain pipe with the arm in one pivotal position,
    means for biasing said arm toward another pivotal position in the absence of the weight of said float, and
    means for actuating an alarm when said arm goes to said other pivotal position comprising
    magnetic means attached to said arm, and
    proximity switch means actuated by said magnetic means.

2. An alarm unit according to claim 1, wherein
    at least part of said solid wall adjacent to said proximity switch being nonmagnetic material in order to pass the magnetic field from said magnetic means therethrough.

3. An alarm unit according to claim 2, wherein
    said float hanging means comprises a flexible stretch-free line.

4. An alarm unit according to claim 3, wherein
    said arm-biasing means comprises a counterweight.

5. An alarm unit according to claim 5, further comprising
    pipe extension means for providing a vertical chamber to contain said hanging float.

6. An alarm unit according to claim 4, further comprising
    a pair of integral lugs on said solid wall and a pivot pin for supporting said pivotal arm.

7. An alarm unit according to claim 4 wherein
    said flexible line comprises a corrosion proof chain.

8. An alarm unit according to claim 4, wherein
    said magnetic means comprises a permanent magnet, and
    said proximity switch means comprises a magnetic type reed switch.

9. An alarm unit for use in a sewer drain of a dwelling or the like, comprising
    a solid walled plug having integral male pipe threads thereon adapted for fitting the female threads on an access opening to a low level pipe in said drain,
    said solid wall being nonmagnetic to permit passage of a magnetic field therethrough,
    a pair of lugs integral with said solid wall and protruding therefrom on the side toward said access opening when the plug is mounted therein,
    a corrosion proof pivot pin extending between said lugs,
    an angled arm mounted on said pivot pin for free pivotal movement between two extreme positions one for each end of said arm being in contact with said solid wall,
    a spherical float for sensing a rise in fluid level in said sewer drain adjacent to said low level drain pipe,
    a corrosion proof chain for hanging said float from one end of said angled arm,
    a permanent magnet attached to said one end of said angled arm on the side toward said solid wall,
    a counterweight attached to the other end of said angled arm for biasing said arm into the extreme position with said permanent magnet in contact with said solid wall,
    said spherical float being heavy enough to hold said angled arm in the other extreme position when hanging free,
    a recess in the outside surface of said solid wall adjacent to the location where said permanent magnet contacts the other side thereof,
    a magnetic type reed switch mounted in said recess for being actuated when said permanent magnet contacts said solid wall, and
    electrical circuit connections for connecting said switch into an alarm circuit.

10. A sewer drain back-up warning unit, comprising in combination
    a pipe threaded cap for replacing the plug of an access opening into said sewer drain,
    said cap having a solid wall for maintaining said access opening plugged,
    an angled arm pivotally mounted on the inside of said solid wall for free pivotal movement between two positions limited by said wall,
    a float hung from one end of said arm by a flexible chain having a predetermined length,
    a magnet carried by said float end of said arm,
    said solid wall being nonmagnetic at least in the vicinity of said magnet,
    a counterweight on the other end of said arm for biasing the arm into said position with the magnet adjacent to said wall when the weight of said float is removed, and
    magnetic switch means adapted for actuation by said magnet when said arm is in said biased position.

* * * * *